Figure 1:
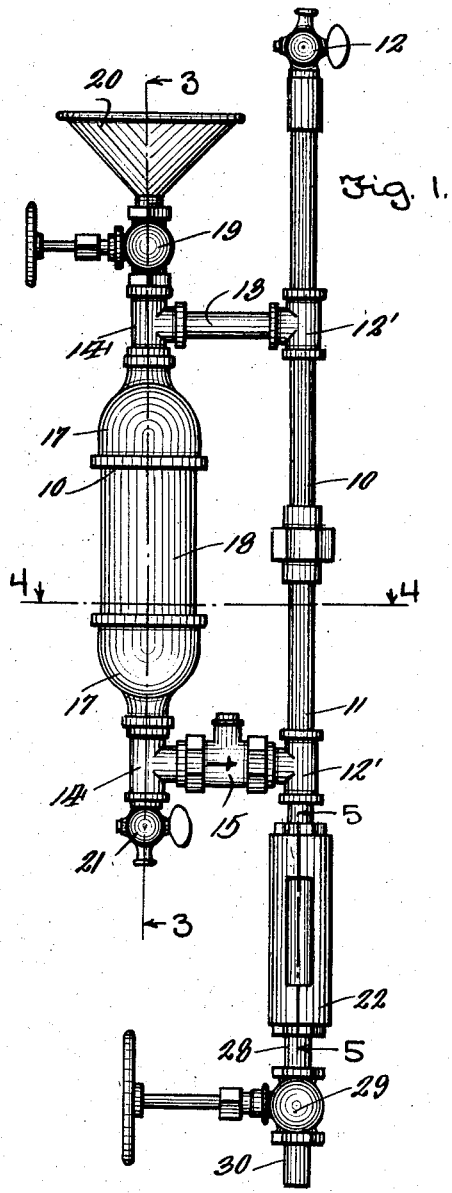

Feb. 4, 1930.     R. A. JENNINGS     1,745,541
FEEDER
Filed Sept. 29, 1926     2 Sheets-Sheet 1

Richard A. Jennings, Inventor

Witness
C. E. Churchman Jr.

By Richard B. Owen

Attorney

Feb. 4, 1930. R. A. JENNINGS 1,745,541
FEEDER
Filed Sept. 29, 1926 2 Sheets-Sheet 2

Richard A. Jennings, Inventor

By Richard B. Owen

Attorney

Patented Feb. 4, 1930

1,745,541

UNITED STATES PATENT OFFICE

RICHARD A. JENNINGS, OF PROVINCETOWN, MASSACHUSETTS

FEEDER

Application filed September 29, 1926. Serial No. 138,560.

The present invention relates to improvements in attachments for heating systems and the like and has for its primary object to provide a feeder attachment whereby a liquid rust removing solution may be fed through the piping system.

A further object of the invention is the provision of a feed attachment of the above character which may be conveniently connected in association with a pipe system for intermittent discharge of the liquid into the piping system.

A further object of the invention is the provision of an apparatus embodying convenient control mechanism for regulating the passage of the rust removing liquid into the piping systems.

Still another object of the invention is the provision of an apparatus of the above character which is compact and durable of construction, which can be conveniently installed in connection with the piping system and which can be manufactured at a relatively low cost.

Other objects and advantages of the invention will become apparent as the description progresses.

Figure 2:
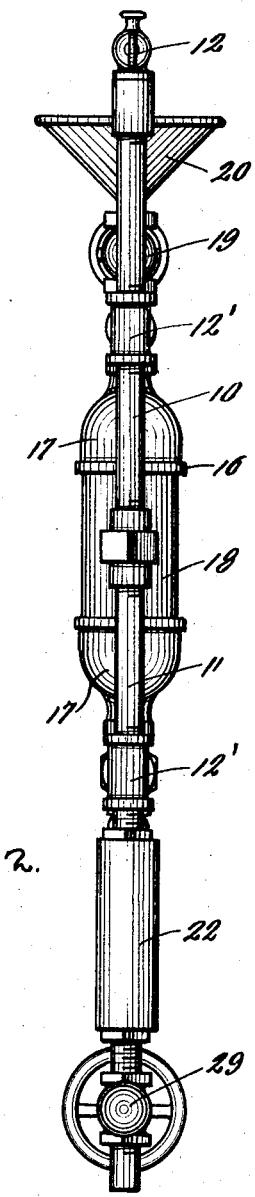
Figure 3:
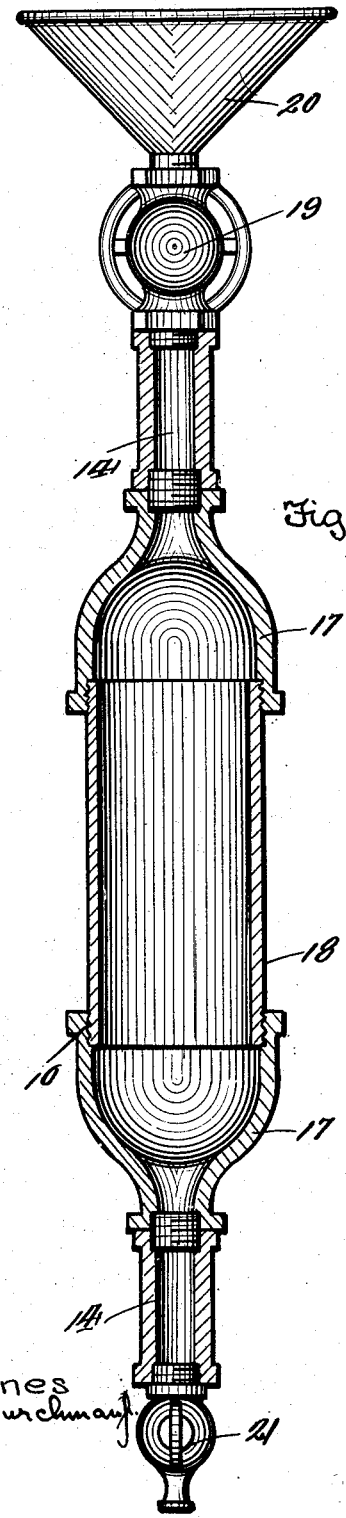
Figure 4:
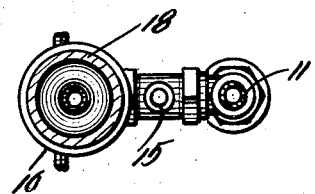
Figure 5:
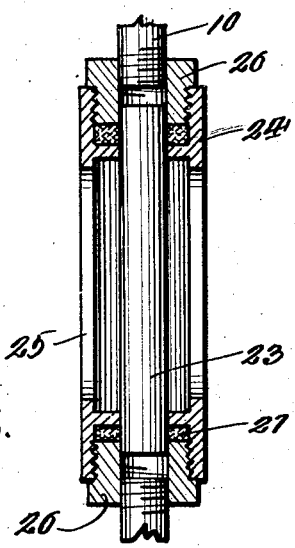

In the accompanying drawings forming a part of this specification and in which like reference characters are employed to designate corresponding parts throughout the same:

Figure 1 is a side elevational view of my improved feeder attachment shown operatively connected with a conveying pipe line, Figure 2 is a front elevational view of the same, Figure 3 is a vertical transverse sectional view taken on the line 3—3 of Figure 1, Figure 4 is a horizontal transverse sectional view taken on the line 4—4 of Figure 1, and Figure 5 is an enlarged vertical sectional view taken on the line 5—5 of Figure 1.

Referring to the drawings, wherein for the purpose of illustration is shown the preferred embodiment of my invention, the numeral 10 generally designates a pipe line forming a part of a pipe system employed for heating purposes or the like. My invention essentially comprises a container mounted adjacent to and connected in communication with a pipe system having control valves arranged for convenient regulation of a solution for removing the rust from the interior of the pipes.

With this in mind, I provide the delivery pipe section 10 formed of a plurality of pipe nipples 11 carrying a ventilating valve 12 at the upper end. At spaced intervals in the delivery pipe section are a pair of T fittings 12' adapted for connection with a by-pass section.

This by-pass structure embodies a horizontal pipe section 13 connected with the upper T 12' and connecting with a second T 14 at its outer end. Threadedly connected with the lower T fitting 12' and extending laterally therefrom is a check valve 15. Rigidly supported in vertical position between the section 13 and the valve 15 is a container 16 embodying reducer couplings 17 at the upper and lower ends threadedly connected with a tubular metallic section 18. This structure forms a cylindrical container intended primarily as a receptacle for an anti-rust solution for circulation through the piping system to remove the rust from the interior of the pipes. Threadedly connected upon the upper ends of the upper T fitting 14 is a control valve 19 preferably of the globe type on which is securely mounted a funnel 20. Threadedly connected with the lower end of the lower T fitting 14 is a drain cock 21 by means of which the container may be emptied when desirable.

Mounted in the lower end of the delivery pipe section 10 is a sight-feed tube 22 embodying a glass tube 23 mounted in a metallic tubular casing 24 having longitudinal vertically projecting slots 25. The glass tube and casing are tightly connected in the delivery line by means of threaded bushings 26 compressing packing rings 27. A comparatively short nipple 28 is threadedly mounted at the lower end of the sight feed tube and connects with a globe valve 29. A second short nipple 30 is connected with the lower end of the valve and formed for connection with the main distributing system.

In the use of the device the valve 29 is closed and a quantity of anti-rust solution is arranged in the container 18 through the use of the funnel 20 and the manipulation of the valve 19. During this operation the valve 12 is open to establish communication with the atmosphere and to dislocate any trapped air in the pipe system. As soon as the solution has been properly placed within the container 18 opening of the valve 29 allows the pressure of the water in the pipe line to establish a uniform pressure throughout the pipe system and above the anti-rust solution in the container 18. This uniformity in pressure throughout the entire pipe system enables the anti-rust solution which is of a greater specific gravity than the water to circulate through check valve 15, sight glass 23 and valve 29 in quantities determined by the extent of opening of the valve 29. As the sight glass 23 is arranged below the container 18 and check valve 15, it will be appreciated that visible indications are given as to the quantity of solution passing into the pipe line. Due to the construction and arrangement of parts and the utility thereof it will be appreciated that the range of use of the device is materially extended and in fact it may be used for various other purposes than set forth in the present application.

It is to be understood that the form of my invention herewith shown and described is to be taken as the preferred example of the same, and that various changes as to the shape, size and arrangement of parts may be resorted to without departing from the spirit of the invention or the scope of the subjoined claims.

Having thus described my invention, I claim:

1. In a structure for introducing liquid into a pipe system, a vertical pipe, a pair of spaced lateral coupling pipes connected to said vertical pipe, an elongated liquid receptacle arranged in vertical position between the outer ends of said lateral pipes and coupled thereto, a one way valve arranged in the lower one of said lateral pipes to permit liquid to pass only from said receptacle into said vertical pipe, means for introducing liquid to the receptacle from the upper end thereof, a control valve between the receptacle and the liquid introducing means, and a vent valve connected into said vertical pipe above the lateral coupling pipe.

2. In a structure for introducing liquid into a pipe system, a vertical pipe, a pair of spaced lateral coupling pipes connected to said vertical pipe, an elongated liquid receptacle arranged in vertical position between the outer ends of said lateral pipes and coupled thereto, a one way valve arranged in the lower one of said lateral pipes to permit liquid to pass only from said receptacle into said vertical pipe, means for introducing liquid to the receptacle from the upper end thereof, a control valve between the receptacle and the liquid introducing means, a vent valve connected into said vertical pipe above the lateral coupling pipe, and a control valve in said vertical pipe at a point below the connection of said lateral pipes therewith.

In testimony whereof I affix my signature.

RICHARD A. JENNINGS.